United States Patent
Arun Singhal et al.

(10) Patent No.: US 9,336,509 B1
(45) Date of Patent: May 10, 2016

(54) CROSSDOCKING TRANSSHIPMENTS WITHOUT SORTATION

(71) Applicant: Amazon Technologies, Inc., Reno, NV (US)

(72) Inventors: Fnu Arun Singhal, Bellevue, WA (US); Nathan Stanley Burkhart, Seattle, WA (US); Vikas Agarwal, Redmond, WA (US); Michael Ellsworth Bundy, Seattle, WA (US); Pavlo Korohod, Kirkland, WA (US); Vidhi Vinodkumar Bhagdev, Seattle, WA (US); Steven Simons Armato, Seattle, WA (US); Ngochan Thi Nguyen, Renton, WA (US); Maxim Kormilitsin, Seattle, WA (US); Paul Jeffrey Stroup, Seattle, WA (US); Kalyanaraman Prasad, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

(21) Appl. No.: 14/228,122

(22) Filed: Mar. 27, 2014

(51) Int. Cl.
  *G06F 7/00* (2006.01)
  *G06Q 10/08* (2012.01)

(52) U.S. Cl.
  CPC .................................. *G06Q 10/087* (2013.01)

(58) Field of Classification Search
  None
  See application file for complete search history.

(56) References Cited

U.S. PATENT DOCUMENTS

| | | | |
|---|---|---|---|
| 5,239,480 A | 8/1993 | Huegel | |
| 5,246,332 A | 9/1993 | Bernard | |
| 5,402,336 A | 3/1995 | Spiegelhoff et al. | |
| 5,615,121 A | 3/1997 | Babayev et al. | |
| 5,660,305 A | 8/1997 | Lasher et al. | |
| 5,712,989 A | 1/1998 | Johnson et al. | |
| 5,727,164 A | 3/1998 | Kaye et al. | |
| 5,771,657 A | 6/1998 | Lasher et al. | |
| 5,839,117 A | 11/1998 | Cameron et al. | |
| 5,880,443 A | 3/1999 | McDonald et al. | |
| 5,930,761 A | 7/1999 | O'Toole | |
| 5,934,413 A | 8/1999 | Konig et al. | |

(Continued)

OTHER PUBLICATIONS

U.S. Appl. No. 12/414,836, filed Mar. 31, 2009, Alexander C. Prater.

(Continued)

*Primary Examiner* — Yolanda Cumbess
(74) *Attorney, Agent, or Firm* — Robert C. Kowert; Meyertons, Hood, Kivlin, Kowert & Goetzel, P.C.

(57) ABSTRACT

Systems and methods may be provided for determining, assigning and directing containers for transshipment between facilities without using an item-level sortation process and moving containers from a receiving area of a facility to an outbound dock without placing the items into inventory. A facility may or may not have item-level sortation processing. Data indicating received items is received. A determination is made for which of the received containers are for transshipment from the materials handling facility based on multiple factors. Containers in receiving that are determined for transshipment may be directed from receive to outbound docks without placing the items into inventory and without using an item-level sortation process. Pallets may be transshipped without placing the items into inventory and without depalletization. A facility with sortation may switch from item-level sortation of transshipments to container-level crossdock transshipment when a sortation process of a processing line approaches or exceeds capacity.

20 Claims, 8 Drawing Sheets

(56) References Cited

U.S. PATENT DOCUMENTS

| | | | |
|---|---|---|---|
| 5,940,807 | A | 8/1999 | Purcell |
| 5,953,234 | A | 9/1999 | Singer et al. |
| 6,023,683 | A | 2/2000 | Johnson et al. |
| 6,061,607 | A | 5/2000 | Bradley et al. |
| 6,081,789 | A | 6/2000 | Purcell |
| 6,272,472 | B1 | 8/2001 | Danneels et al. |
| 6,285,986 | B1 | 9/2001 | Andrews |
| 6,324,522 | B2 | 11/2001 | Peterson et al. |
| 6,341,271 | B1 | 1/2002 | Salvo et al. |
| 6,344,796 | B1 | 2/2002 | Ogilvie et al. |
| 6,377,867 | B1 | 4/2002 | Bradley et al. |
| 6,418,416 | B1 | 7/2002 | Rosenberg et al. |
| 6,530,518 | B1 | 3/2003 | Krichilsky et al. |
| 6,654,662 | B1 | 11/2003 | Hognaland |
| 6,654,726 | B1 | 11/2003 | Hanzek |
| 6,698,655 | B2 | 3/2004 | Kondo et al. |
| 6,701,299 | B2 | 3/2004 | Kraisser et al. |
| 6,937,992 | B1 | 8/2005 | Benda et al. |
| 6,971,833 | B1 | 12/2005 | Freudelsperger et al. |
| 6,990,488 | B1 | 1/2006 | Chenault |
| 7,246,706 | B1 | 7/2007 | Shakes et al. |
| 7,249,044 | B2 | 7/2007 | Kumar |
| 7,331,471 | B1 | 2/2008 | Shakes et al. |
| 7,504,949 | B1 | 3/2009 | Rouaix et al. |
| 7,587,345 | B2 | 9/2009 | Mann et al. |
| 7,653,688 | B2 | 1/2010 | Bittner |
| 7,686,171 | B1 | 3/2010 | Shakes et al. |
| 7,693,758 | B1 | 4/2010 | Bacco et al. |
| 7,941,244 | B2 | 5/2011 | Somin et al. |
| 7,979,359 | B1 * | 7/2011 | Young .............. G06Q 10/06 705/1.1 |
| 8,073,723 | B1 | 12/2011 | Bilibin et al. |
| 8,386,323 | B1 | 2/2013 | Chenault et al. |
| 8,401,975 | B1 * | 3/2013 | Tian .............. G06Q 10/08 705/330 |
| 8,429,019 | B1 | 4/2013 | Yeatts et al. |
| 2001/0034658 | A1 | 10/2001 | Silva et al. |
| 2001/0047285 | A1 | 11/2001 | Borders et al. |
| 2001/0056395 | A1 | 12/2001 | Khan |
| 2002/0010659 | A1 | 1/2002 | Cruse et al. |
| 2002/0042756 | A1 | 4/2002 | Kumar |
| 2002/0046157 | A1 | 4/2002 | Solomon |
| 2002/0069115 | A1 | 6/2002 | Fitzpatrick |
| 2002/0077919 | A1 | 6/2002 | Lin et al. |
| 2002/0077929 | A1 | 6/2002 | Knorr et al. |
| 2002/0095307 | A1 | 7/2002 | Greamo et al. |
| 2002/0107763 | A1 | 8/2002 | Palmer |
| 2002/0111880 | A1 | 8/2002 | Stutts |
| 2002/0147651 | A1 | 10/2002 | Hoar |
| 2002/0147657 | A1 | 10/2002 | Callender |
| 2002/0165782 | A1 | 11/2002 | Falkenstein et al. |
| 2002/0178074 | A1 | 11/2002 | Bloom |
| 2002/0188499 | A1 | 12/2002 | Jenkins et al. |
| 2002/0188516 | A1 | 12/2002 | Farrow et al. |
| 2003/0116484 | A1 | 6/2003 | Takizawa |
| 2003/0172007 | A1 * | 9/2003 | Helmolt .............. G06Q 10/087 705/28 |
| 2003/0178481 | A1 | 9/2003 | Kondo et al. |
| 2004/0176962 | A1 | 9/2004 | Mann et al. |
| 2004/0220884 | A1 | 11/2004 | Khan |
| 2004/0230601 | A1 | 11/2004 | Joao et al. |
| 2005/0043850 | A1 | 2/2005 | Stevens et al. |
| 2005/0055285 | A1 | 3/2005 | Myrick et al. |
| 2005/0102203 | A1 | 5/2005 | Keong |
| 2006/0224398 | A1 | 10/2006 | Laikshman et al. |
| 2006/0224423 | A1 * | 10/2006 | Sun .............. G06Q 10/04 705/7.12 |
| 2006/0282277 | A1 * | 12/2006 | Ng .............. G06Q 10/08 705/333 |
| 2007/0062851 | A1 | 3/2007 | Schulz et al. |
| 2007/0136079 | A1 | 6/2007 | Beykirch et al. |
| 2007/0150383 | A1 | 6/2007 | Shakes et al. |
| 2007/0203811 | A1 | 8/2007 | Hoopes et al. |
| 2007/0276684 | A1 | 11/2007 | Scott et al. |
| 2009/0043617 | A1 | 2/2009 | Thomas |
| 2009/0081008 | A1 | 3/2009 | Somin et al. |
| 2010/0235210 | A1 | 9/2010 | Nadrotowicz, Jr. |

OTHER PUBLICATIONS

U.S. Appl. No. 12/909,546, filed Oct. 21, 2010, Linda S. Fitzwater.
U.S. Appl. No. 14/133,519, filed Dec. 18, 2013, Salman Hamid Ali.
Online Shopping Priorities Shifting From Best Merchandise Price to Total Transaction Cost and Fulfillment Services, Pr Newswire [New York] Jul. 25, 2000, downloaded from ProQuestDirect on the Internet on Dec. 16, 2012, pp. 1-3.
Business Holiday Shipping Is a Breeze with Airborne Express Enhanced Services, PR Newswire [New York] Nov. 21, 2002, downloaded from ProQuestDirect on the Internet on Dec. 16, 2012, pp. 1-3.
"Schedule My Delivery," Copyright 2010 Manna freight Systems, Inc., found at http://www.manna.com/SCHEDULE/tracking.aspx, Accessed Mar. 16, 2013, 1 page.
Best Buy Outlet Center, Best Buy, Copyright 2003-2010, found at http://www.bestbuy.com/site/olspage.jsp?type=p.&contentId=1142292388976&i- d=cat12098, Accessed Mar. 16, 2010, pp. 1-6.
"Your M&S: Delivery Options," Copyright 2010 Marks and Spencer, fournd at http://www.marksandspencercom/Delivery-Options-Delivery-Help/b/43695031, Accessed Mar. 16, 2013, 1 page.
Argos, "Home Delivery," Copyright Argos Limited 2010, found at http://www.argos.co.uk/static/StaticDisplay/includeName/OrderingForHomeDe- livery.htm, Accessed Mar. 16, 2010, pp. 1-6.
"Product Search," printed from http://mailroomconsultancysurveys.com/mail . . . on Sep. 29, 2005, Apr. 15, 2004 , pp. 1-17.
U.S. Appl. No. 11/023,759, filed Dec. 28, 2004, Jonathan J. Shakes.
White, Ron, "How Computers Work," Millennium Ed. Que Corporation, Sep. 1999, pp. 1-283.
Derfler, Frank J. et al., "How Networks Work," Millennium Ed., Que Corporation, Jan. 2000. pages 1-229.
Gralla, Preston, "How the Internet Works," Millennium Ed., Que Corporation, Aug. 1999, pp. 1-333.
U.S. Appl. No. 11/150,493, filed Jun. 9, 2005, John Chenault.
U.S. Appl. No. 09/921,011, filed Aug. 1, 2001, John Chenault.

* cited by examiner

CROSSDOCKING TRANSSHIPMENTS WITHOUT SORTATION

BACKGROUND

Manufacturers, distributors, retailers, and other processing entities with facilities (which may collectively be referred to as materials handling facilities) typically receive, process and send (e.g., sell) materials. For example, retailers, wholesalers, and other product distributors (which may collectively be referred to as distributors) typically order, receive and maintain an inventory of various items that may be ordered by clients or customers for delivery. Distributors may receive inventory at an area of a facility, for example at a receive area. Items may be received from various sources such as vendors, manufacturers, other distributors, other facilities of the same distributor or from various other sources, for example. The items may be received on pallets, in bins, or other containers in heterogeneous groups or homogenous groups, for example, but also may be received as singles.

Some distributors receive the inventory at the receiving area where it may be broken down into smaller groups and may then be sent to an inventory area for stowing. When groups of items, (e.g., pallets or cases of items) are desired for shipment from the facility, the distributor may take the time to reconstruct the pallets or cases of items from an inventory area where the items were stowed to after being received to the receiving area.

For facilities with a sortation process, some groups of items (e.g., groups or containers of heterogeneous items) that are received may be sent from the receiving area to a sortation area where the items may be sorted before being sent to a customer or another facility. For example, some items that are received at a distributor may be destined for another destination, such as another distribution facility. Some such items may not be sent into inventory for stowing, but rather sorted from other items (e.g., sorted from items going to other destinations or inventory) and directed to an outbound dock of the facility without ever being stowed to inventory in the facility. Such routing of sorted items may be referred to as crossdocking Transshipments (e.g., shipments between distribution facilities of a common distributor) may be performed as well. Given that supporting a crossdocking process may require a sortation process, for example, when a container otherwise eligible for crossdock includes a group of items destined for different destinations, distribution facilities without a sortation process may not implement crossdocking.

Figure 1:
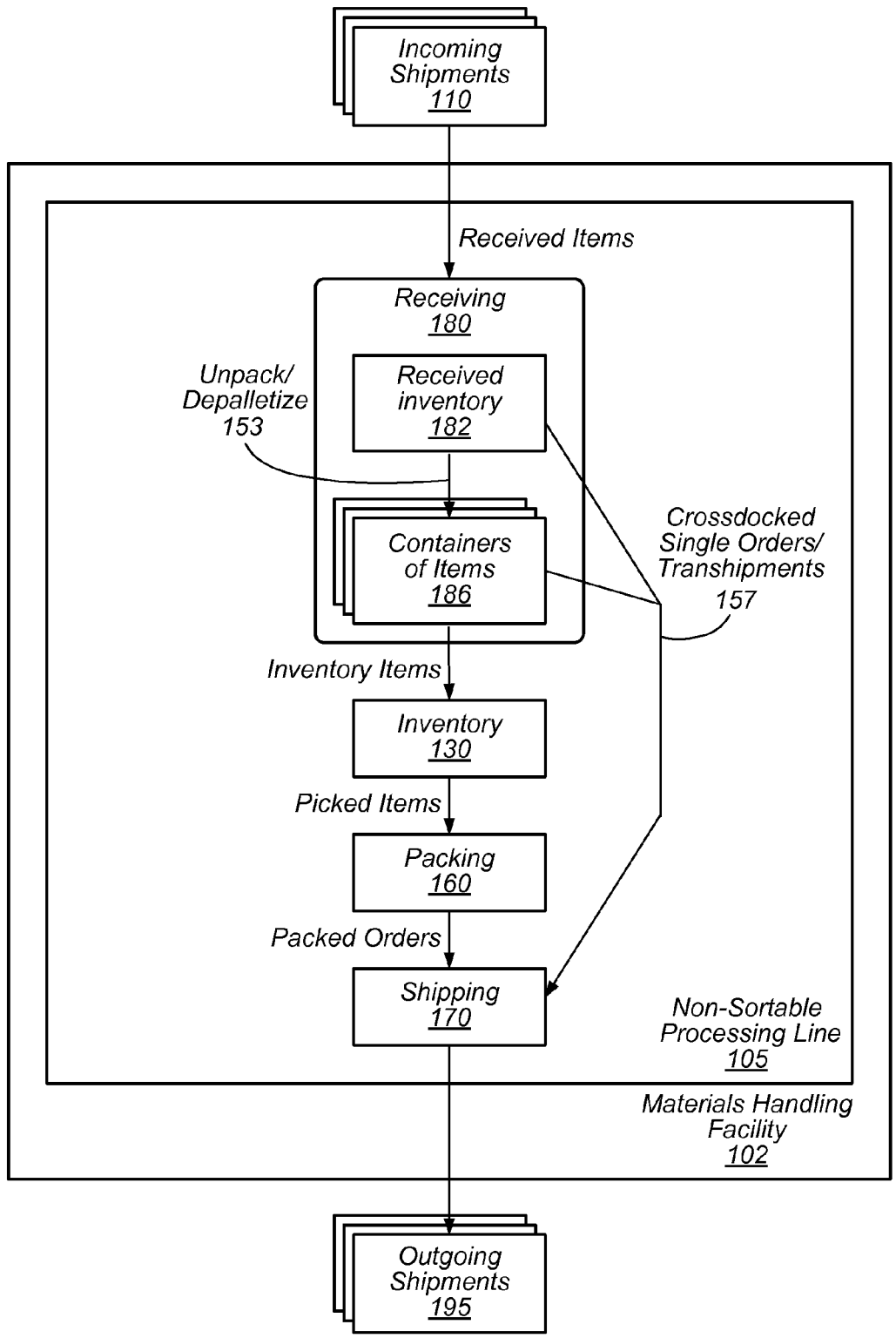
FIG. 1 is a block diagram that illustrates relationships between processes and objects of a non-sortable processing line in a materials handling facility, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

A materials handling facility may receive materials that are processed by the facility. For example, a manufacturer may receive components or raw materials that are manufactured into finished products or a distributor may receive goods that are processed for fulfillment to retail customers. A receiving area of the materials handling facility may be configured to receive the incoming shipments of materials and provide space for the incoming shipments to be processed. For example, pallets or other container of received items may be broken down into smaller (e.g., saleable or stockable) sizes and may be placed into inventory or otherwise processed. Some materials handling facilities may have an inventory area where the received materials may be stowed for storage until they are needed for processing.

After the distribution facility has received the items into the facility at a receiving area, agents of the facility may stow the items to the inventory area or otherwise process the received items. In a materials handling facility (e.g., a distribution facility), multiple, different product items may be stored together in a single inventory area, such as a shelf, rack, bin, or drawer. For example, a facility may store items such as books, CDs, DVDs, electronic devices, clothing, toys, hardware, materials, and/or other items together in various combinations within each inventory area.

While the inventory is waiting in the receiving area for further processing (e.g., in a receive lane where items are electronically scanned to identify the items to a facility control system and await further processing) the facility control system may determine whether to send the received inventory to the inventory area or to otherwise process the received inventory. For example, some facilities may provide for space in the receiving area or elsewhere where received items await direction to an outbound dock without ever being stowed to inventory. Such a process may be referred to as crossdocking Some such routing may or may not include a sortation process where items intended for different destinations (e.g., facility inventory, distributor customers and/or other distribution facilities may be different destinations) may be sorted from one another.

Crossdocking, including crossdocking for transshipments, may be supported for facilities that do not support a sortation process, or for which a sortation process is not currently available. For example, a control system for the facility may identify containers of items in a receiving area of the facility and select particular ones of those containers, at a container-level granularity, for a transshipment crossdock process. As part of the transshipment crossdock process, the control system may direct the selected containers from the receiving area to a shipping area of the facility for transshipment to another facility without the items in the selected containers being stowed in an inventory area and without the items in the selected containers going through an item-level sortation process.

In other embodiments, crossdocking may be employed in conjunction with a sortation process such that groups of items that have been received at the facility together in a container, for example, may be directed through a sortation process where the items are sorted into separate containers and thereby grouped for a common destination, such as a customer or another distribution facility. In some cases, the process may continue after the sortation such that the containers of items are directed to an outbound dock without the items of the container ever being stowed to inventory of the facility.

For example, containers of items or groups of items may be sent from one distribution facility to another distribution facility (the facilities may be owned or controlled by the same or different entities in various embodiments). Such movement of items between similar facilities, different facilities under the control of the same entity or any combination thereof may be known as transshipment and may be performed for any number or reasons including managing inventory levels of the facilities or leveraging existing or regular transportation resources between the facilities or of the controlling entity in order to reduce costs or reliance upon common carriers, for example. A transshipment of items may be based on a decision to allocate those items to another facility of an entity and may be distinct from a shipment to a customer of the entity based on an order from the customer.

In some embodiments, the facilities may be members of a common fulfillment network controlled by a common entity (e.g., a merchant or retailer). However, in some cases, a facility may be configured to process transshipments to materials handling facilities from within a different fulfillment network controlled by a different entity Sortable and Non-Sortable Facilities Materials handling facilities may be configured in any number of ways. For example, some materials handling facilities may include a processing line (also called operations) arranged to process items through the facility. A processing line may include areas or stations for performing various processes such as picking from inventory, sorting of picked items, packing of picked items and/or shipping of packed items. Various embodiments of processing lines may include additional processes, different processes, or fewer processes in any combination. A processing line may comprise an item-level sortation process where groups of picked items may be sorted into sorted orders. Such processing lines with item-level sortation may be referred to as sortable processing lines and a facility including a sortable processing line may be referred to as a sortable facility. Some materials handling facilities may include a processing line without an item-level sortation process or any sortation process at all. Some such processing lines may be referred to as non-sortable processing lines and a facility including only non-sortable processing lines may be referred to as a non-sortable facility. In some embodiments, a processing line or facility without an item-level sortation process may be used to process orders for single items given that no sortation is required to fulfill such orders. In some embodiments, a materials handling facility may use sortable processing lines exclusively, non-sortable processing lines exclusively, or may contain any number of both sortable and non-sortable processing lines. For example, a non-sortable processing line may be used for single item orders and a sortable processing line may be used for multiple-item orders within the same materials handling facility.

Sortation may be performed at various levels of granularity. In some embodiments, item-level sortation refers to a sortation of one or more items that results in the sorted items leaving a facility in particular containers. For example, two different items that were received in two different containers on two different pallets or were stored in two different inventory locations may be sorted into the same container (e.g., either a transshipment container or an order fulfillment shipping container) such that the two items leave the facility together in the same container. In another example, an item that was stowed in an inventory along with other types of items may be sorted into a single container such that the single container leaves the facility with only the single item. Item-level sortation may be performed as part of a processing line (e.g. a fulfillment processing line). In some embodiments, transshipments may be directed through the item-level processing of the fulfillment processing line. In other embodiments, transshipments may be performed without use of a sortation process. For example, items for transshipment may be determined and directed at a granularity corresponding to containers or pallets of items in an inventory receiving area of the facility.

In some embodiments, container-level sortation refers to a sortation of one or more containers. For example, containers may be sorted based upon the determined destination of the items they contain. A container determined to hold items destined for the same location may be directed to that location without the items within the container being sorted (e.g., it may be determined that all the items in a container holding items from one or more broken-down pallets are all destined for another facility and may be directed directly to that facility without being stowed to an inventory area). Such determination and direction may be referred to as a container-level sortation. Container-level sortation may include a container with a single item, in some embodiments.

In some embodiments, container-level sortation may be performed for containers of items in the receiving area. For example, items may be depalletized into containers and a control system may determine, subsequent to depalletization and on a container-by-container basis whether the containers should be directed to an inventory area for stow or to an outbound dock for transshipment. In some embodiments, container-level sortation includes determining which transportation resource a container will be placed into. In some embodiments, container-level sortation may not be performed until items are placed into the container. For example, in some embodiments, agents may depalletize or otherwise unpack a container of items into other containers (e.g., totes) without direction (e.g. from a control system) or as the agents see fit. In some such embodiments the contents of the containers the items are placed into may not be planned. It may be understood that processes such as breaking down a pallet into containers may not be considered a sort when it is done to fill totes destined for inventory (e.g., random-stow inventory) or crossdocking without knowing what is needed in either of inventory or by other facilities.

In some embodiments, instead of breaking received containers of items into smaller containers, entire pallets of received items (packed with heterogeneous or homogeneous items) may be considered containers and the pallets may be sorted based on the destination for the entire pallet.

Transshipments and crossdocking may be combined in some embodiments, either for fulfilling a distributor's customer orders (e.g., transshipments may be used to reduce shipping costs or combine items into a single shipment for fulfillment) or for moving inventory among facilities, for example. In some instances, a control system (e.g., a nonsortable distribution facility control system) may determine that items received at the distribution facility should be used to increase inventory at another distribution facility. For example, the control system of the distribution facility or a central control system of an entity controlling the distribution facility may receive inventory data for other or all distribution facilities of the entity or for multiple entities and may determine an inventory plan based on the received inventory and demand estimates. The inventory plan may determine a desired amount of inventory for various facilities and also how inventory should be shifted among facilities to reach the desired level.

The control system may determine that containers of items received for inventory at one distribution facility are eligible to be transshipped to a destination facility. The containers may be containers of heterogeneous items (e.g., different items received from a vendor in a container, or different items placed in a container at a receiving lane of the facility, or items received in a transshipment container from another facility, etc.). Containers may also include homogeneous items. The control system may identify transshipment opportunities at a container-level granularity from identified eligible containers in an inventory receiving area of a facility. Because transshipments are selected at a container-level granularity from containers of items in the receiving area, an item-level sortation process is not required and the transshipment can be carried out at a facility, or using a processing line, that does not have an item-level sortation process. Eligible containers for transshipment may be determined by the control system as containers of the received items have not been stowed to inventory. For such containers selected for transshipment, the control system may direct the containers to be crossdocked to an outbound dock where they can be shipped to the destination distribution facility. Crossdocking may save time and costs associated with storing items to inventory. In some embodiments, a decision to transship and/or crossdock may be performed either on an item-by-item basis, unit-by-unit basis, a container-by-container basis, or combinations thereof. In such embodiments, transshipment may or may not involve the use of an item-level sortation process.

In some embodiments, the type of packaging or the grouping of the items within a container may also be used determine, at least in part, whether the container is available for crossdocking and/or transshipment. For example, if a pallet of pens is received into receiving and the smallest unit of packaging created from de-palletization in the receiving area is a case of 12 pens, the item may be made eligible for crossdocking and/or transshipment only for cases of 12 pens but not at an individual pen package granularity. If only cases (or any other container-level granularity) of an item are readily available at the receiving area, then only cases of the item may be eligible for transshipment and/or crossdocking Such a determination may be based on how shipments are broken down in the receiving area, for example.

A crossdock-enabled control system may comprise various components in various arrangements. In one example, the crossdock-enabled system may comprise a control system and any number of variously configured devices used to determine items and/or containers of items that are in the receiving area of the facility (e.g., via scanners or other communication devices) and to determine the eligibility of the item and/or container for crossdocking and/or transshipment. In some embodiments, the processes disclosed herein at the direction of the crossdock-enabled control system may be practiced in addition to other operations (e.g., checking for backorders that can be fulfilled from items in the receiving area before the items are sent to either reserve or primary inventory or making items in primary inventory available for transshipment).

Various processing may be performed when an item is received at a receiving area of the facility. For example, some items may arrive on shipping resources at a shipping dock, while in other embodiments items may be received at a receiving area from another facility via conveyors or forklifts, for example. The determination of whether an item is eligible for transshipment and/or crossdocking may depend upon whether the item, or container including the item, is available for fulfillment from the receiving area in some embodiments. In embodiments, eligibility for transshipment and/or crossdocking may be based upon one or more various factors and the factors may vary for different facilities. For example, an item may have been unloaded from a shipping vehicle into the receiving area, but not have been scanned yet. In some embodiments, items that have not been scanned are not eligible, while in other embodiments, items that have not been scanned may be eligible, for example, based on an estimated time of arrival at the facility or based upon a determination of the actual arrival of the transportation resource the item was expected to arrive on. In embodiments, item eligibility may begin when an item is scanned at receiving. In other embodiments, item eligibility may begin when or after an item has been processed at receiving, for example, the shipping packaging for some items may be broken down at receiving (e.g., depalletized or broken down into smaller containers before being moved into reserve inventory or sent for transshipment). In some embodiments, an item may not be eligible until the item has been depalletized, for example. In embodiments, an item may remain eligible for crossdocking after leaving the receiving area. For example, containers of items that can be redirected from a conveyance device moving items from the receiving to the inventory area may retain eligibility as long as containers can still be redirected to shipping or packing before being stowed in the inventory area.

Various processes associated with determining whether items or containers of items in receiving are eligible for transshipment and/or crossdocking and directing eligible items or containers of items for transshipment and/or crossdocking are disclosed. In some embodiments, the determination and direction may be made for materials handling facilities that do not support or provide item-level sortation processing of the items. FIG. 1 is a block diagram that illustrates relationships between processes and objects of a nonsortable materials handling facility, according to some embodiments. The figure illustrates that orders for items (e.g., singles) as well as transshipments for containers of items, may be crossdocked directly from receiving to shipping. For example, containers of single items and transshipments may be assigned to a crossdocking process that moves the items or containers from receiving to shipping (e.g., an outbound dock) without processing the item/transshipments through inventory storage or an item-level sortation process.

In FIG. 1, incoming shipments 110 (e.g., from a vendor, manufacturer, another materials handling facility, etc.) are received at a receiving area 180. The received items may arrive in any of various containers (e.g., pallets, shipping boxes, etc.) and the items of the containers may be unpacked/depalletized 153 (e.g., broken into smaller units) and placed into other containers (e.g., totes) of items 186 for stowing into inventory 130 or for crossdocking/transshipment 157. In some embodiments, the entirety of the items or a portion of the items of a container may be retained within the container they are received in for crossdocking and/or transshipment. In some embodiments, the items from a received container may be placed into another container or containers, either for moving the items to inventory or to crossdock and/or transship the item(s), for example.

A non-sortable processing line 105 is illustrated in FIG. 1 as part of materials handling facility 102. In the illustrated embodiment, the non-sortable processing line 105 includes receiving 180, inventory 130, packing 160 and shipping 170. In other embodiments, the non-sortable processing line may include additional or fewer processes or may share some processes with other processing lines. In some embodiments, a non-sortable processing line may share receiving 180 with another processing line or may share inventory 130 with another processing line. Containers of items 186 in receiving 180 that are for inventory area 130 may be directed to inventory area 130, for example, by a control system (not illustrated in FIG. 1). For example, a control system for the materials handling facility 102 may instruct an agent to stow the item to inventory 130 or to place the item in a receptacle that is transported to an inventory area 130 by a conveyance device. As illustrated within the non-sortable processing line of FIG. 1, the items in inventory 130 may be picked by agents to fulfill orders and conveyed to packing 160 where the picked items may be packed and the packed orders may be sent to shipping 170 (e.g., an outgoing dock) where the packed orders are placed into transportation resources (e.g., trucks) that transport outgoing shipments 195 of the packed orders.

At any time, the materials handling facility may be receiving incoming shipment 110 (e.g., new inventory or transshipments from other facilities). Agents may unload the incoming shipments from shipping vehicles into receiving 180. The agents may scan the incoming shipment as it is unloaded. The agents may also scan the items as they are being broken down from larger units (e.g., pallets) and placed into containers such that a control system receives indications of which items are in which containers. In some embodiments, a control system may determine whether any portion of the incoming shipment or any of the containers with the placed items are eligible for crossdocking and/or transshipment. For example, a control system for the materials handling facility may determine (e.g., based upon inventory and or demand at various facilities) that the items of a container are eligible and may instruct the container to be crossdocked and/or transshipped. In another example, the control system may determine that a container of items is ineligible for crossdocking and/or transshipment (e.g., if the items of a container are destined for multiple transshipment destinations and the facility lacks sortation processing, for example). The items that are not selected for crossdocking may be moved on for stowing to inventory 130 until the items are needed for order fulfillment or for transshipment, for example.

Received items may be marked or tagged with a bar-code, radio frequency identification (RFID) tag, Universal Product Code (UPC), Stock-Keeping Unit (SKU) code, serial number, and/or other designation (including proprietary designations) to facilitate materials handling facility 102 operations, including, but not limited to, picking 140, sorting 150 and packing 160. These designations, or codes, may identify items by type, and/or may identify individual items within a type of item. Areas of the facility may be marked with similar designations that identify the area (e.g., particular locations in storage or a particular receive lane in receiving or a packing station). Containers may also be marked in a similar fashion. The control system may also include, or may function in conjunction with, handheld, mobile and/or fixed scanners or scanning devices that may be able to scan the marks or tags on individual items, containers and/or facility areas to determine and record an identifier of an item, container and/or a corresponding location.

Distribution facilities may be operated such that the items received in the receiving area are electronically scanned. For example, as part of the receiving process, an agent or a processing system may use an electronic device to scan bar codes or other types of labels that are associated with the received containers that hold the items or to scan the bar codes or labels of the items. The data gathered by the scan may be stored in a data store or sent to the control system for processing. In some embodiments, the control system may process the information from the scan (e.g., as part of an inventory analysis for the facility or other facilities) and send information based on the scanned information to other facilities and/or receive information based on scan information from other facilities.

Some facilities may separate inventory into various different inventory areas or maintain separate inventories. In an example, a facility may have a longer-term storage area (e.g., reserve storage) for items that are picked from inventory less frequently and a shorter-term storage area (e.g., primary storage) for items that are picked from inventory more frequently. Sometimes inventory from the longer-term storage area may be used to replenish the shorter term storage area. In some embodiments, either of the longer-term storage or the shorter-term storage may be stocked from new items of inventory that are received at a shipping and receiving area. For example, some facilities may receive shipments of items into the facility at a receiving area where the items are scanned into a facility control system that tracks the inventory of the facility.

Information, such as scan information, as described herein in various embodiments, may be used to determine that an item has been received into the receiving area. For example, in some embodiments, fulfillment center personnel, sometimes called agents, who unload received items during receiving 180, may scan items as they are unloaded into receiving. In another example, an automated scanner may scan items as the items enter receiving (e.g., via conveyor). The scan information may be sent to a control system for determining item eligibility of received items for a crossdocking and/or transshipment process.

A control system may direct orders for single items and transshipments to be crossdocked 157; crossdocking may indicate that the item or a container is to be directed from receiving 180 to shipping 170 without going through inventory 130. In the illustrated embodiment, crossdocking also avoids packing 160. However, in some embodiments, crossdocking may avoid inventory 130 but include packing 160. In the illustration, crossdocking may not include item-level sortation when the facility does not support item-level sortation.

The arrangement and order of operations illustrated by FIG. 1 is merely one example of many possible embodiments of the operation of a facility that implements a system for crossdock management. Other types of materials handling, manufacturing, or order fulfillment facilities may include different, fewer, or additional operations and resources, including sortation, according to different embodiments.

Figure 2:
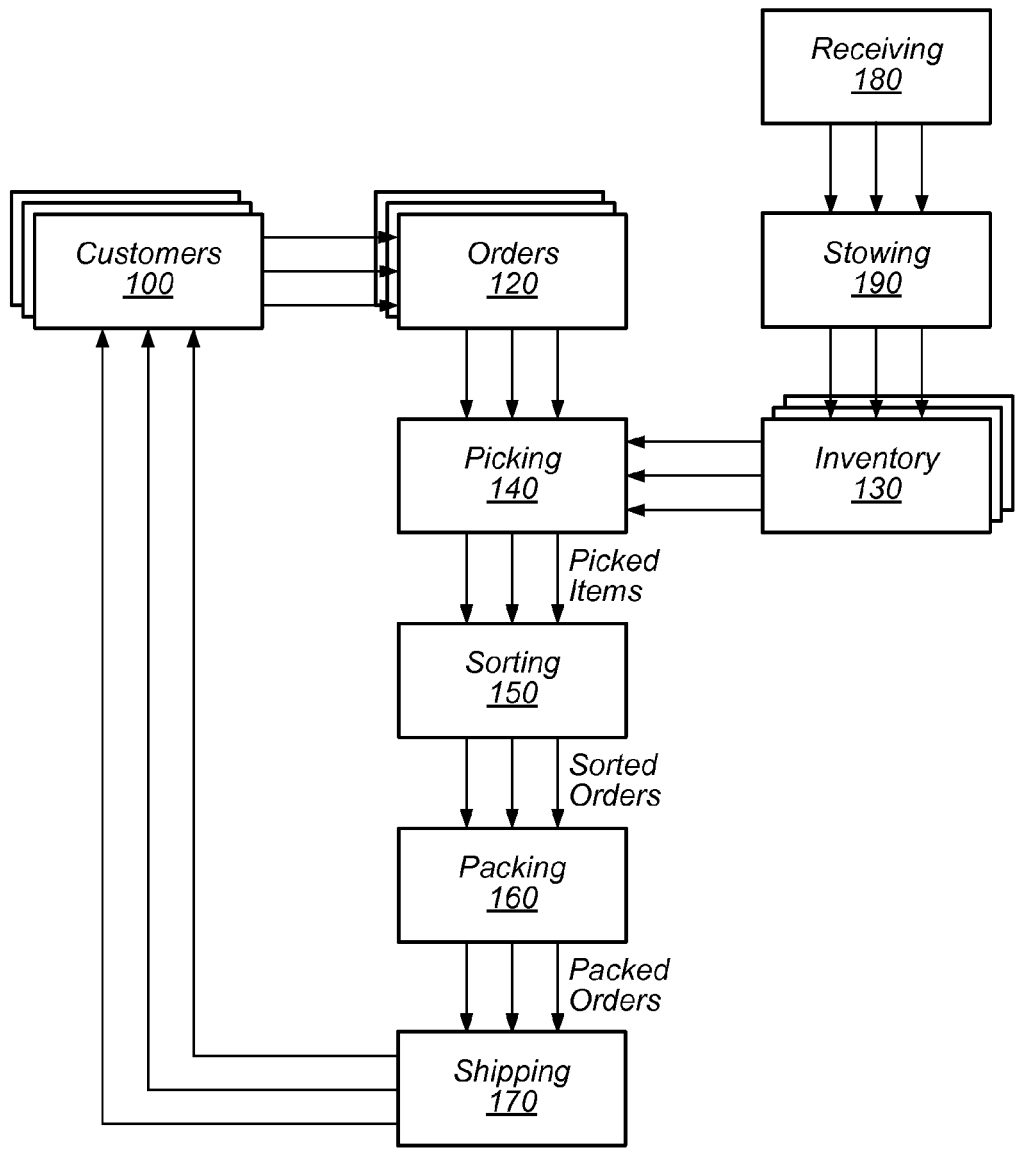
FIG. 2 illustrates a logical representation of various operations of a materials handling facility with sortation, according to some embodiments.

A typical distribution facility or other materials handling facility may include an inventory management system employing a control system in control of various operations of the facility. FIG. 2 illustrates a broad, view of the operations of one such facility, which, in one embodiment, may be configured to utilize a control system as described herein. In this example, multiple customers 100 may submit orders 120 to the distributor of the items in the facility, where each order 120 specifies one or more items from inventory 130 to be shipped to the customer that submitted the order. To fulfill the customer orders 120, the one or more items specified in each order may be retrieved or "picked" from inventory 130 (which may also be referred to as stock storage) in the order fulfillment facility, as indicated by block 140. In some embodiments, agents may identify inventory locations in inventory 130 for picking items. Picked items may be delivered to one or more stations in the materials handling facility for sorting 150 into their respective orders, packing 160, and finally shipping 170 to the customers 100. For example, after obtaining items from inventory 130 or from the receiving area 180, picking agents may transfer those items to sorting stations 150, according to one embodiment. Not every materials handling facility includes both sorting and packing stations. In certain embodiments, agents may transfer picked items directly to a packing station, such as packing station 160, and the picked items may be directed to a particular packing station by control system 300. A picked, packed and shipped order does not necessarily include all of the items ordered by the customer; a shipped order may include only a subset of the ordered items available to ship at one time from one inventory-storing location.

Some distribution facilities may store different copies of items in different individual inventory areas within stock storage. Storing copies of items in multiple inventory areas may shorten the distance, and therefore the time, required to obtain an item from inventory, in some embodiments. Additionally, different items may be stored in a single inventory area, according to certain embodiments. Storing different items together may result in more efficient use of total inventory space than using a single inventory area for multiple copies of a single item or product. It still may be beneficial in some embodiments to store similar items together to make better use of inventory space. For example, storing different books together on a single inventory shelf may use the available inventory space more efficiently than storing one book among other items of greatly differing size and shape, such as electronic devices, clothing, toys, hardware, materials, or other items. Thus, in some embodiments, a distribution facility may store items of similar shape and size together in a single inventory area. For instance, in such an embodiment, items such as books, compact discs (CDs), and digital video discs (DVDs) may all be stored together. In some embodiments, multiple copies of an item may be stored together with multiple copies of other, different items. For example, a single inventory area may store multiple copies for each of several different books, CDs, or other items.

In certain embodiments, items may be randomly stored together in inventory areas. Such random storage may increase storage efficiency and may in some cases increase the likelihood that any individual item may be easily distinguished from the other items with which it is stored. Random storage of items may also decrease the amount of time needed to store individual items into inventory. A control system for the facility may track where each item is stowed. As previously described, in some embodiments, determining where to store an item may be performed manually, while in other embodiments, it may be an automated process performed by one or more computer software programs based on pattern information associated with the individual items, and/or based upon positional placement guidelines.

In other embodiments, agents may transfer picked items to a combination sorting and packing station (not illustrated). This may result in a stream and/or batches of picked items for multiple incomplete or complete orders being delivered to a sorting station 150 for sorting into their respective orders for packing and shipping, according to one embodiment illustrated by FIG. 2. Portions of an order may be received at different times, so sorting 150 and packing 160 may have to wait for one or more items for some orders to be delivered to the sorting station(s) 150 before completion of processing of the orders. A stream or batches of incoming picked items may be sorted into their respective orders at the sorting station(s) 150. While, in some embodiments, automated sorting may be utilized, such as through the use of Crisplant or Eurosort sorters, in other embodiments sorting may be performed manually. In yet other embodiments, both manual and automatic sorting may be used in combination. Once an order is completed at a sorting station 150, the order may be ready to proceed to a packing station 160 to be packaged for shipping 170.

A materials handling facility typically also includes a receiving operation 180 for receiving shipments of stock from various vendors and a stowing operation, illustrated as stowing 190, for placing the received stock into stock storage (inventory 130). In some embodiments, stowing 190 may involve stowing an item in a location within inventory area 130 selected by a control system (e.g., randomly, pseudo-randomly, or according to various guidelines for stowing similar or different items within the facility). In some embodiments, stowing 190 may involve scanning the item and/or the inventory location when adding items to one of the plurality of inventory areas in inventory 130. Various devices may be used to direct a stowing agent to a particular location and/or position within the inventory area and/or location in which an item is to be stowed.

In some embodiments, a distribution facility may receive an order for an item not currently in facility inventory. When the item is received, the order may then be filled and shipped. When an order is received for an item before the item has been received at a distribution facility, the received item may or may not be stocked into inventory before being matched up with the order and shipped out, according to various embodiments. The receipt of the item at the facility may trigger the fulfillment process for a pending order. Whereas FIG. 1 (a non-sortable processing line) illustrates that a pending order for a single item may be fulfilled using a crossdock process, where the pending order is fulfilled with an item from receiving such that the item does not pass through inventory 130, FIG. 2 (illustrated with a sorting process as part of the processing line) illustrates that a pending order for multiple items may be fulfilled by waiting for the item to make its way from receiving 180, through stowing to inventory 130, picking 140, sorting 150, packing 160 and shipping 170.

In FIG. 2, to fulfill the customer orders 120, the one or more items specified in each order may be retrieved or "picked" from inventory 130 (which may also be referred to as stock storage) in the order fulfillment facility, as indicated at 140. In contrast, FIG. 1 illustrates that a system employing a cross-dock management system may determine that items may be picked or fulfilled from the receiving area instead of the inventory area. In FIG. 2, picked items may be delivered to one or more stations in the materials handling facility for sorting 150 into their respective orders, packing 160, and finally shipping 170 to the customers 100. Picked, packed and shipped order does not necessarily include all of the items ordered by the customer; a shipped order may include only a subset of the ordered items available to ship at one time from one inventory-storing location.

A materials handling facility typically includes a receiving operation 180 for receiving shipments of stock from various vendors and a stowing operation, illustrated as stowing 190, for placing the received stock into stock storage (inventory 130). In some embodiments (e.g., illustrated in FIG. 1) a system employing a crossdock management system may determine whether items received during the receiving operation 180 are eligible for crossdocking (e.g., unfilled customer orders or transshipments). In some embodiments (e.g., FIGS. 1 and 2) stowing 190 may involve stowing an item in a location within inventory 130 selected by a control system (e.g., randomly, pseudo-randomly, or according to various guidelines for stowing similar or different items within the facility).

A crossdock management system, as described herein, may be utilized in a number of different facilities and situations, including, but not limited to material handling facilities, distribution facility, order fulfillment centers, rental centers, distribution centers, packaging facilities, shipping facilities, libraries, museums, warehouse storage facilities, shopping centers, grocery stores, car parking lots, etc. In general, a crossdock management system may be used in any situation in which items in receiving are to be sent to an outbound dock without being processed through an inventory area.

Figure 3:
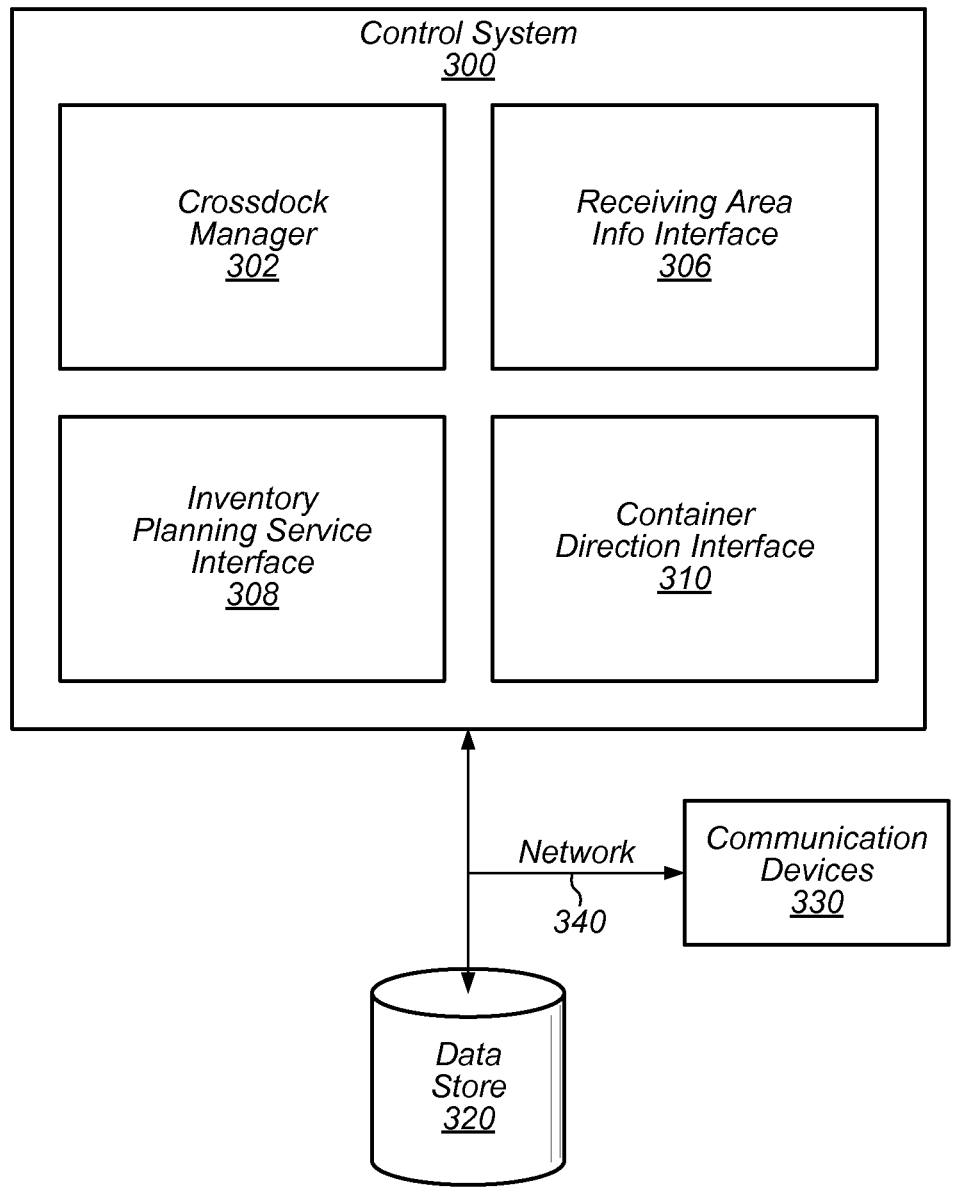
FIG. 3 illustrates a block diagram for a control system with a crossdock manager, according to one embodiment.

A materials handling facility may include a control system with various components for receiving, processing and sending data. The control system may communicate with other control systems from other entities, such as other distribution facilities in order to determine crossdock transshipment opportunities, for example. FIG. 3 illustrates a block diagram for a control system with a crossdock manager 302, according to one embodiment. A distribution facility (such as materials handling facility 102) may implement a crossdock-enabled control system or control system for short, as part of its overall inventory management system. A control system (such as illustrated in FIG. 3 and described below) may include hardware and software configured for assisting and/or directing agents and/or devices in the materials handling facility (e.g., materials handling facility 102) in managing inventory and fulfilling customers' orders. For example, in some embodiments, such a control system may receive information, such as scan information from communication devices 330 (e.g., scanners) and inventory information from data store 320 and transmit information such as instructions to other communications devices 330, which may display the instructions and other information to a picking agent or a stowing agent or may instruct automated devices to direct items to various areas of the facility.

In some embodiments, control system 300 may include a receiving area information interface 306 for accessing receiving area information. For example, receiving area info interface 306 may access a receiving area service or access a data store (e.g., data store 320) to access receiving area information such as scan information about received inventory, about containers for the inventory, about locations of the items or containers, and the like. Control system 300 may also include inventory planning interface 308 that may have access to an inventory planning service or data store that provides inventory planning information for inventory on the way to the instant facility as well as other facilities. Other information, such as demand forecasts for the instant facility as well as other facilities may also be available via the inventory planning service interface 308, from a central inventory planning service of an enterprise, for example.

Crossdock manager 302 may determine what items and/or containers in receiving are suitable for a crossdock process, for example, based on one or more factors such as those received from inventory planning interface 308 as well as the receiving area information received via receiving area info interface 306. Crossdock manager 302 may also send instructions directing a crossdock process to be carried out for one or more items or containers. For example, crossdock manager 302 may send instructions to an agent or device to direct containers from the receiving area to a shipping area without the items in the containers being stowed to an inventory area. In some embodiments, crossdock manager 302 may instruct the direction to be performed without performing an item-level sortation on the items in the containers. In some embodiments crossdock manager 302 may send instruction to container direction interface 310, instructing direction of the containers from the receiving area to a shipping area.

Container direction interface 310 may receive instructions from crossdock manager 302 for directing containers to be crossdocked. For example, container direction interface 310 may receive instructions to direct containers and in response to the instructions, container direction interface may determine whether to instruct an agent (via communications device) or automated equipment to direct the container to the shipping area and then send an instruction to carry out the determination. In some embodiments, container direction interface 310 may send instructions to a display communication device instructing an agent to put a container on a conveyance mechanism and may instruct the conveyance mechanism to direct the container to a shipping area.

Communication devices 330 may send and/or receive information. For example, a scanner communication device may be used to scan item or container information and may send the scanned information to a service or a data store (e.g., data store 320). In another example, agents may view stationary or mobile display communication devices that display instructions or other information to the agents. In another example, an automated communication device may automatically scan items or containers as they travel by on a container or may direct items on a conveyance device to various destinations of the conveyance device.

Data store 320 may be any of various configurations recognized by one of skill in the art. In various embodiments, such a data store may be configured as a database, as one or more mass storage devices (e.g., physical disks, logical volumes, etc.) configured to store data blocks or files, or in any other suitable configuration for data storage. In one example, data store 320 may comprise a data store that is local to the facility and in another example, data store 320 may be part of an enterprise data store that stores data for an enterprise controlling multiple facilities.

Figure 4:
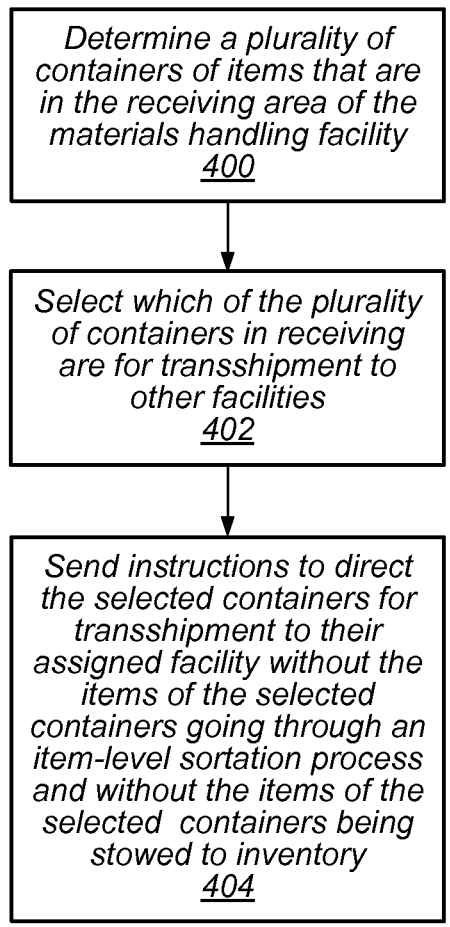
FIG. 4 illustrates a flow diagram of a routing process for transshipments implemented by a control system with a crossdock manager, in some embodiments.

A materials handling facility may transship received items to other facilities, to manage inventory or reduce shipping costs for fulfilling received orders, for example. FIG. 4 illustrates a flow diagram of a process for transshipments implemented by a control system with a crossdock manager, in some embodiments. In embodiments, the process illustrated in FIG. 4 may be performed by various components of control system 300. In at least one embodiment, the process illustrated is performed by a control system for a non-sortable processing line of a materials handling facility (e.g., FIG. 1).

At block 400, a plurality of containers of items that are in the receiving area of the materials handling facility are determined. For example, pallets of items may be depalletized, scanned and placed into containers and the control system 300 may determine from the scanned information which containers have which items. In some embodiment, entire pallets in the receiving area may also be considered containers. At block 402, the crossdock manager may determine which ones of various containers in receiving to select for transshipment to other facilities. In some embodiments, control system 300 selects the containers for transshipment at a container-level granularity. The selection may be based on various criteria or factors including the scanned information, inventory information for the various facilities and demand forecast information, in some embodiments. At block 404 instructions are sent to direct the selected containers for transshipment to their assigned facility without the items of the selected containers going through an item-level sortation process and without the items of the selected containers being stowed to inventory. For example, control system 300 may send instructions to communication devices or automated equipment instructing the selected containers to be directed or moved from the receiving area straight to a shipping area without item-level sortation of the items within the container and without the items within the container being stowed to inventory area 130. A selected container may be sent straight to the shipping area without the items being removed from the container.

In some embodiments with facilities or processing lines without a sortation process, only containers that have items destined for a common destination may be eligible to be selected for crossdocking and transshipment to another facility. In some embodiments, facilities or processing lines without a sortation process cannot transship or crossdock containers with multiple items destined for different destinations. Such facilities may, however, crossdock transshipments of containers that hold items all destined for the same destination (e.g., another facility).

Figure 5:
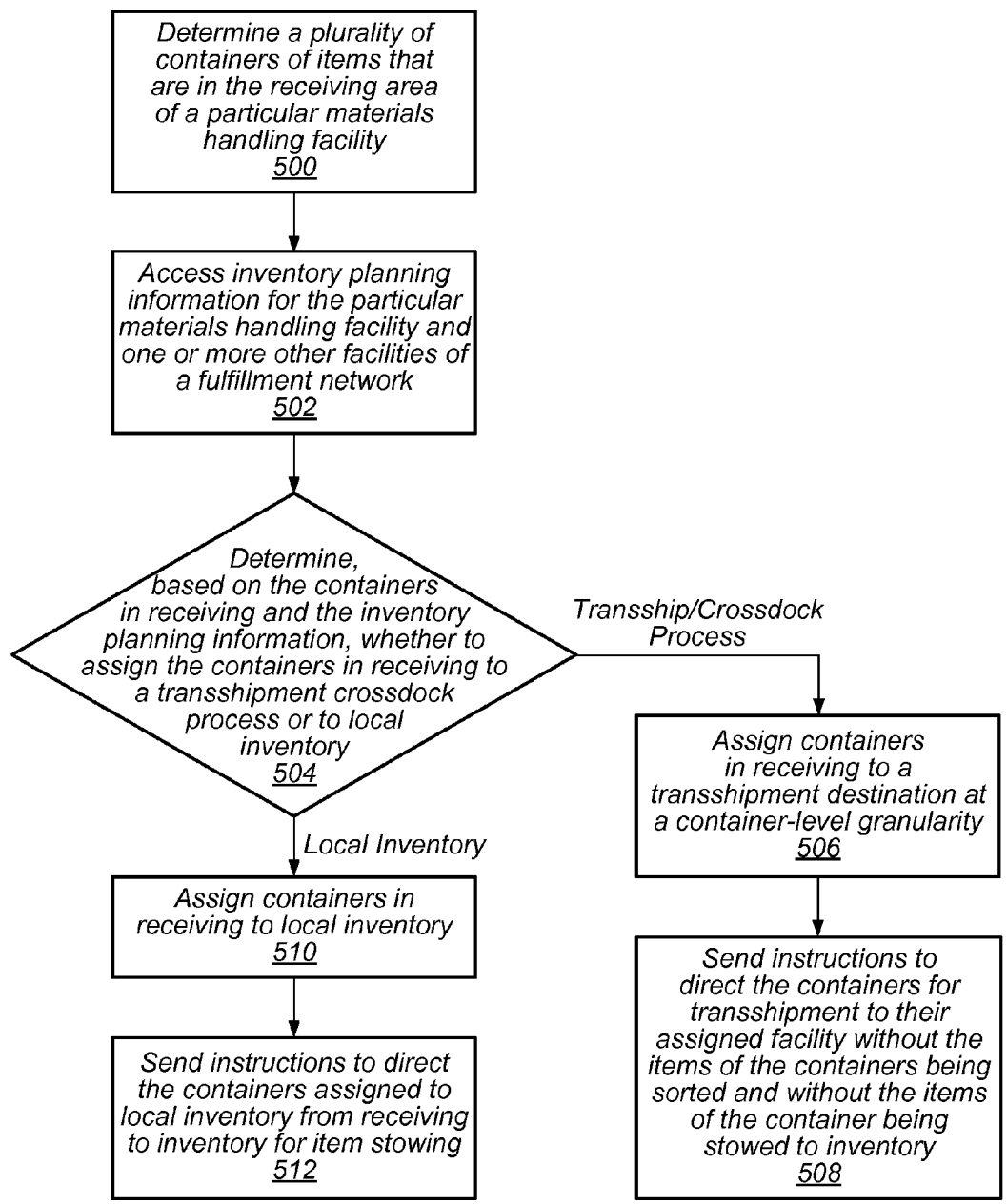
FIG. 5 illustrates a flow diagram of a routing process dependent upon the containers in receiving and inventory planning information implemented by a control system with a crossdock manager, according to one embodiment.

For some facilities, a control system may determine whether to route containers in the inventory receiving are to a transshipment crossdock process or assign the containers to a local inventory area. FIG. 5 illustrates a flow diagram of a routing process dependent upon the containers in receiving and inventory planning information implemented by a crossdock manager, according to one embodiment.

In some embodiments, the process illustrated in FIG. 5 may be carried out at facilities with or without an item-level sortation process. In some embodiments, facilities that have been restricted from or are otherwise unable to perform transshipment crossdocking (e.g., due to a lack of sortation processing sometimes required for crossdocking) may implement the following transshipment crossdocking process at a container-level granularity. The process illustrated in FIG. 5 may also be carried out at facilities with item-level sortation, in embodiments.

The process illustrated in blocks 500-513 may be implemented by various components of a control system (e.g., control system 300). In some embodiments, crossdock manager 302 may perform the process in conjunction with other components of the control system. At 500, a plurality of containers of items that are in the receiving area of a particular materials handling facility are determined. For example, electronic scanning devices may be used by agents to scan item and container information such as designations and the scanned information may be used to determine which items are in which container.

At 502, inventory planning information for the particular materials handling facility and one or more other facilities of a fulfillment network may be accessed. For example, control system 300 may access a database or inventory planning service that provides inventory planning information to crossdock manager 302. In some embodiments, the database or planning service may provide inventory planning information for one or more facilities including the facility managed by the crossdock manager.

At 504, a determination of whether to assign the containers in receiving to a transshipment crossdock process or to a local inventory may be made. The determination may be made based on the containers in receiving and the inventory planning information. For example, in some embodiments, the control system may make the determination based upon one or more factors, such as those described herein.

In some embodiments, the control system 300 may use a computer-based selection model to determine whether the entire container should be sent to a single destination. The model may analyze any number of factors. For example, the model may take as inputs transportation costs (both the cost of transshipping inventory to another facility and the cost of shipping inventory to a customer) as well as labor cost. Additional possible inputs to the selection model include, but are not limited to, the set of facilities and their processing capabilities (e.g., sortable or non-sortable processing lines), current inventory in the facilities, expected future inventory arrivals at the facilities, predicted customer demand for facilities, the estimated cost to fulfill that customer demand at facilities, total estimated crossdock volume, the cost of sortation for the container, and the transfer time between each set of facilities. Other factors are also contemplated as inputs to the selection model. In some embodiments, the selection model may be generated and/or analyzed by the crossdock manager 302 of the control system 300. In various embodiments, the factors may come from a data store of factors (e.g., data store 320), from other components of the control system, other services or may be calculated by the crossdock manager 302 based on other data from various sources such as the control system 300, data store 320 or data stores and control systems of other facilities and the like. In some embodiments, analysis of the factors may result in unexpected results such as crossdocking an entire container as a transshipment when only some of the items of the container are needed for inventory at a destination facility. For example, the cost of transshipping the container with one or more extra items may be less than the cost of other ways of meeting the inventory needs of the destination facility, such as transshipments from other locations or another delivery from a vendor.

When the determination is for a transshipment crossdock process, the containers in receiving are assigned to a transshipment destination at a container-level granularity (block 506). For example, for a destination facility that has been determined for more inventory of an item, the crossdock manager 302 may assign one or more containers of the item in receiving for that destination facility. Similar determinations may be made for other facilities and other containers of other items. In some embodiments, containers may contain heterogeneous groups of items and destination facilities may be determined in need of the heterogeneous items in the container such that containers of heterogeneous items are transshipment crossdocked to other facilities.

At 508, instructions are sent to direct the containers for transshipment to their assigned facility without the items of the containers being sorted and without the items of the container being stowed to inventory. For example, based on the determination of which containers of items are for transshipment, the crossdock manager may store an indication of the determined containers (e.g., in data store 320) and/or send instructions to container direction interface 310, instructing the determined containers to be transshipped via a crossdocking process that avoids the inventory area processing and avoids item-level sortation of the items in the container.

At 510, containers in receiving that have been determined for local inventory are assigned to local inventory processing. For example, at a facility with no item-level sortation process, the control system may determine that the items in the container would be destined for more than one destination as transshipment and because there is not a sortation process available to sort the items into different containers for different destinations, the items cannot be sorted for those destinations. At 512, instructions may be sent to direct the containers assigned to local inventory from receiving to inventory for stowing. In some embodiments, the control system may send instructions to container direction interface 310 directing the containers selected for inventory to be directed to inventory, for example on a conveyance mechanism.

Figure 6:
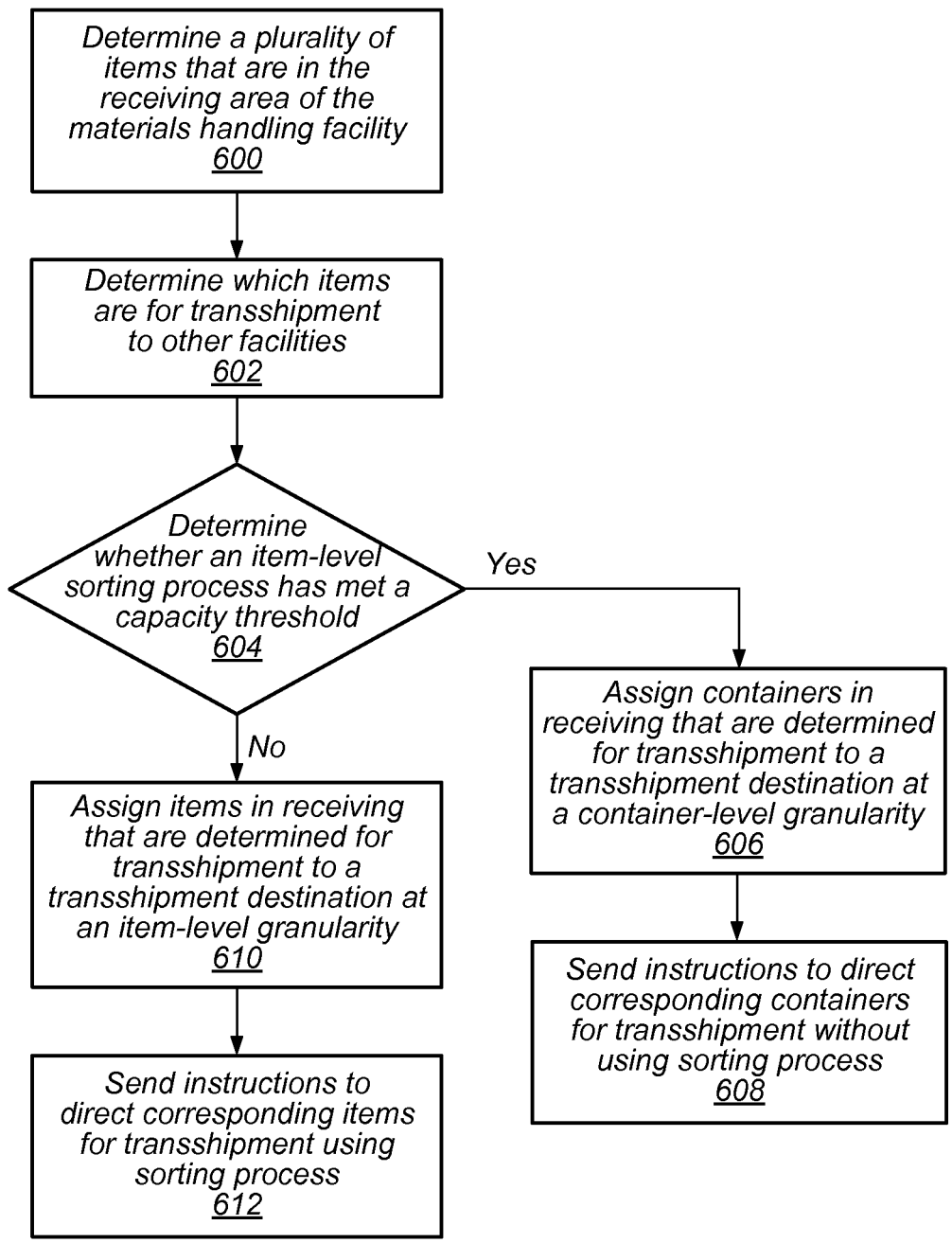
FIG. 6 illustrates a flow diagram of a routing process implemented by a control system with a crossdock manager for a sortable materials handling facility, according to one embodiment.

In some embodiments, a control system for a facility with item-level sortation processing may determine to transship crossdock containers at a container-level granularity. FIG. 6 illustrates a flow diagram of a routing process implemented by a crossdock manager for a sortable materials handling facility, according to one embodiment. In some embodiments, the sortable distribution facility may include the sortable processing line illustrated in FIG. 7. The process described in blocks 600-612 may be performed by various components of a control system (e.g., crossdock manager 302). At 600, a plurality of items that are in the receiving area of the materials handling facility are determined. For example, as described above, pallets of items that are received may be broken down, such that the items are scanned and placed into containers. In some embodiments, the received pallets of items serve as containers and are scanned. The control system may receive the scan information or indication thereof and use the received information to determine the items and the containers in the receive area. At 602, items are determined for transshipment to other facilities. In some embodiments, the factors described above for FIG. 5 or other criteria may be used to determine which items are for transshipment to other facilities.

At 604 a determination of whether an item-level sorting process has met a capacity threshold is determined. For example, a processing line in a distribution facility may process items for fulfillment of orders (e.g., picking 140, sorting 150, packing 160 and shipping 170 of FIG. 2 may comprise a processing line in some embodiments). Sometimes, for example, when processing rates are high, the sortation process 150 may become a bottleneck for the processing line such that the capacity of the sorting process 150 becomes the capacity of the processing line. In some embodiments, the control system may be configured to determine that the capacity threshold of the sorting process has been reached, is about to be reached or has been exceeded. The capacity threshold may be an arbitrary threshold based on past experience, may be calculated based on sortation theory, may be adjusted based on factors, may be determined by a physical attribute such as a length of a queue of items that enter the sortation process or may be determined any number of other ways as practiced in the art.

When the item-level sorting process (e.g. sorting 150 in FIG. 7) has met a capacity threshold, containers in receiving that are determined for transshipment (FIG. 7, transshipments 155) are assigned to a transshipment destination at a container-level granularity (block 606). For instance, crossdock manager 302 may determine that the sortation process becomes too expensive (e.g., customer orders may not be fulfilled in a timely manner if they cannot be sorted in a timely fashion) as sortation reaches capacity and may instead direct transshipment of entire containers instead of sorting transshipment containers prior to transshipment. In some embodiments, container-level transshipment determinations may allow for transshipment of containers that include more items than are needed for transshipment. For example, control system 300 may determine that tradeoffs between factors such as transportation costs, item demand and sortation delay times may favor a decision to crossdock a container even if the container includes more units of an item than is needed or includes some items that are not needed at the destination facility at all. At 608, instructions are sent to direct corresponding containers for transshipment without using a sorting process. In this manner, the sortation process may be freed to sort more customer orders in place of the transshipments. In some embodiments, the crossdock manager may send instructions to the container direction interface 310, instructing the interface 310 to direct corresponding containers from receiving to shipping for transshipment to another facility without using an item-level sortation process (e.g., crossdock containers 730 in FIG. 7).

If the item-level sortation process has not met a capacity threshold, items in receiving that are determined for transshipment may be assigned to a transshipment destination at an item-level granularity (block 610) and instructions are sent to direct corresponding items for transshipment using the sorting process (block 612). For example, control system 300 may determine that the capacity threshold of the item-level sortation process has not been reached, and direct processing of transshipments via the item level sortation process as well as send instructions to container direction interface 310 to direct containers of sorted items for transshipment via a processing line (e.g., crossdock items 720 in FIG. 7) or otherwise. In some embodiments, the item-level sortation process may be part of a processing line (e.g., the processing line comprising sorting 150, packing 160 and shipping 170 in FIG. 7).

Figure 7:
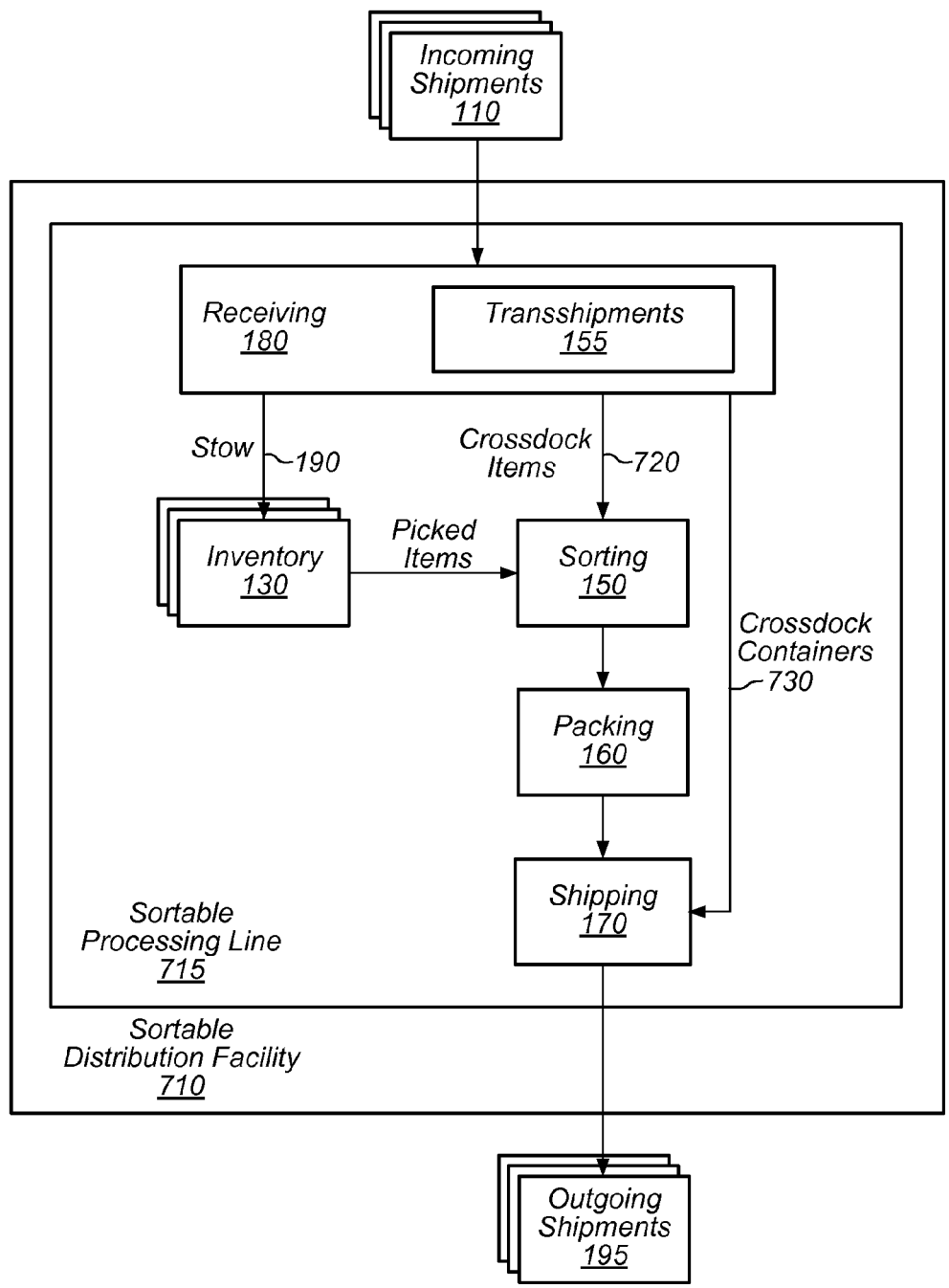
FIG. 7 is a block diagram that illustrates relationships between processes and objects of a sortable processing line in a materials handling facility, according to some embodiments.

Distribution facilities with sortable processing lines also provide opportunities for crossdocking and transshipments of items in receiving. FIG. 7 is a block diagram that illustrates relationships between processes and objects of a sortable processing line in a materials handling facility, according to some embodiments. The sortable processing line 715 of sortable materials handling facility 710 is illustrated with incoming shipments 110, receiving 180, inventory 130, packing 160, shipping 170 and outgoing shipments 195 that are similar to the corresponding processes and objects described in FIG. 1, above, but sortable processing line 710 is also illustrated with sorting 150 where item-level sortation processing may be performed.

As illustrated in FIG. 7, in some embodiments, the control system may direct fulfillment of an item from receiving 180 such that the item is moved from receiving 180 to sorting 150 without the item ever being placed into an inventory area 130 (e.g., crossdock items 720). For example, the control system (e.g., control system 300) may instruct an agent to pick the item from the receiving area and to take the item or place the item on a conveyor to sorting 150 or to an outbound dock in shipping 170. In another example, the control system may instruct a conveyor system that is conveying items from receiving 180 to inventory area 130 to redirect the item to sorting such that the item does not go to inventory area 130.

In the illustrated embodiment, sorting 150 may receive items or containers of items from inventory 130 or receiving 180. For example, sorting 150 may receive picked items from inventory 130 or items intended for crossdocking from receiving 180 that are destined for multiple destinations. In the illustrated embodiment, a control system (e.g., control system 300) may determine that received items in receiving 180 are to be crossdocked. For example, the control system may select items for transshipments 155 or items for fulfilling customer orders from receiving for crossdock based on their location in receiving 180 and a need to transship or fulfill an order for the item. The control system may direct automated equipment or an agent to move the multi-destination cross dock items in containers to sorting 150 via a conveyance mechanism such as a conveyor or via agent from receiving 180. As illustrated by arrow 720, the crossdock items from receiving may be directed to and received at sorting without the items being placed into inventory. The control system may direct the agents or automated equipment to move the multi-destination cross dock items through sorting 150 to packing and shipping 170 where they may be placed in outgoing shipments 195. Crossdock items may comprise transshipments to other facilities or items for fulfilling orders to customers.

Also illustrated in FIG. 7, single destination crossdock items may be moved directly from receiving 180 to shipping 170 without being stowed to inventory 130 (crossdock containers 730). For example, sorting 150 may become a bottleneck for the sortable processing line 715. In some embodiments, sorting 150 may reach a capacity for sorting items that is less than the capacity of other processing in the sortable processing line such as packing 160 or shipping 170. The control system may be configured to recognize the bottleneck or capacity constraint at sorting 150 and responsively determine orders or transshipments for items in receiving 180 that do not require sortation. The control system may issue instructions directing the determined items in receiving to be crossdocked (for example, to shipping 170, or to packing 160 and then shipping 170) without or instead of being stowed to inventory. Implementing such a crossdock process may increase overall capacity of the facility.

Figure 8:
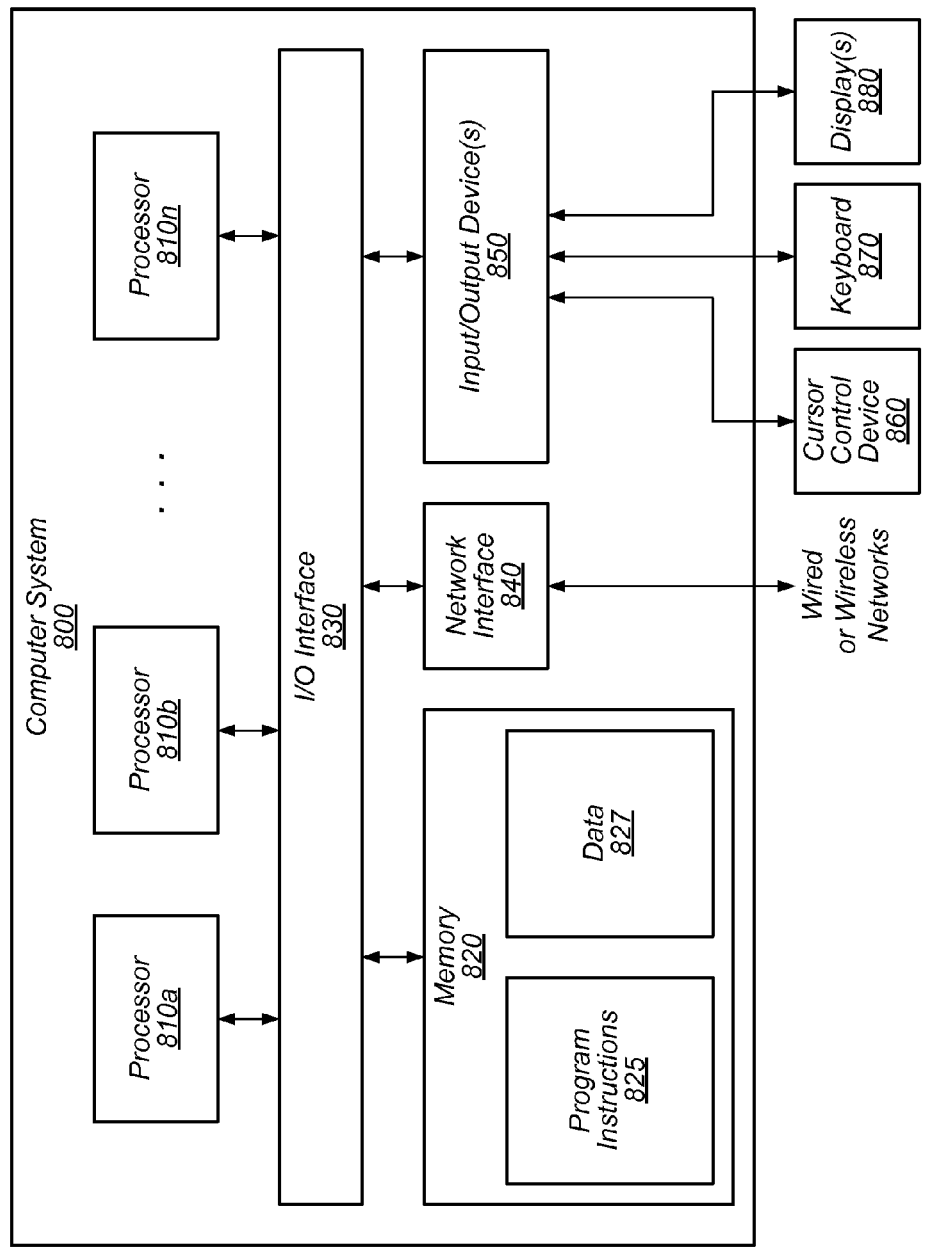
FIG. 8 is a block diagram illustrating a computer system suitable for use in various of the embodiments disclosed herein.

Any of various computer systems may be configured to implement a system for crossdocking transshipments within a materials handling facility. For example, FIG. 10 is a block diagram illustrating one embodiment of a computer system suitable for implementing the system and methods described herein. In various embodiments, a control system (e.g., control system 300 of FIG. 3), a materials handling facility (e.g., materials handling facility 102), or a communication device (e.g., scanner) may each include a general-purpose computer system such as computer system 800 illustrated in FIG. 8.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of control system 300, while in other embodiments control system 300 may include more, fewer, or different elements than computer system 800. In some embodiments, computer system 800 may be illustrative of control system, (e.g., 300), or a communication device (e.g., scanner) while in other embodiments a control system or communication device may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for a crossdock-enabled control system, a fulfillment center control system, or a communication device, are shown stored within system memory 820 as program instructions 825. In some embodiments, system memory 820 may include data 827 (e.g., a product database).

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, for example. In particular, network interface 840 may be configured to allow communication between computer system 800 and/or various I/O devices 850. I/O devices 850 may include scanning devices, display devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to the agents, and devices integrated into or mounted on any mobile or fixed equipment of the materials handling facility such as pushcarts, bins, totes, racks, shelves, tables, ceilings, walls, and work benches, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 300. In general, an I/O device 850 (e.g., cursor control device 860, keyboard 870 or display(s) 880) may be any device that can communicate with control system 300 and convey instructions to agents within the facility. In one embodiment, at least some of the I/O devices 850 may be configured to scan or otherwise read or receive codes or identifiers of various components in the materials handling facility and to communicate the entered codes to control system 300 for use in directing agents in the various operations of the control center (e.g., bar code scanners, RFID readers, cameras, or any other sensing devices). Such components may include, but are not limited to, one or more of items, orders, modular sorting stations, modular bins, and compartments of modular bins.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the control system, product database, display devices, and/or other communication devices).

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A materials handling facility, comprising:
a receiving area configured to receive items into the materials handling facility;
an inventory storage area configured to store items in inventory in the materials handling facility;
a shipping area configured to ship items to customers to fulfill customer orders, and to transship items to one or more other materials handling facilities; and
a control system configured to:
determine a plurality of containers of items that are in the receiving area of the materials handling facility;
assign one or more containers of the plurality of containers of items in the receiving area to a stow process for stowing the items into the inventory storage area of the materials handling facility;
assign one or more other containers of the plurality of containers of items in the receiving area to a transshipment crossdock process in which a transshipment destination is assigned to each of the one or more other containers at a container-level granularity such that the items in a respective container of the one or more other containers are assigned to the same transshipment destination; and
for the transshipment crossdock process, direct the one or more other containers of items from the receiving area to the shipping area for transshipment to another materials handling facility without the items in the one or more other containers being stowed in the inventory area and without the items in the one or more other containers going through an item-level sortation process.

2. The materials handling facility of claim 1, wherein the control system is further configured to direct items to shipping for order fulfillment using a processing line that does not include a sortation process for sorting items for shipping, wherein the one or more other containers of items are directed from the receiving area to the shipping area for transshipment to another materials handling facility using the processing line that does not include a sortation process.

3. The materials handling facility of claim 1, wherein the control system is further configured to direct items to shipping for order fulfillment using a processing line that does include a sortation process for sorting items for shipping, wherein the sortation process sorts items for containers that leave the facility, and wherein the one or more other containers of items are directed from the receiving area to the shipping area for transshipment to another materials handling facility without using the sortation process.

4. The materials handling facility of claim 3, wherein the control system is further configured to:
assign items to a transshipment destination at an item-level granularity and direct the items for transshipment using the processing line that does include a sortation process; and
in response to determining that the sorting process has met a capacity threshold, switch to assigning items to a transshipment destination at a container-level granularity and directing corresponding containers for transshipment without using the sortation process.

5. The materials handling facility of claim 1,
wherein the materials handling facility is part of a fulfillment network comprising the materials handling facility and a plurality of other materials handling facilities, and wherein the control system determines which containers of items in the receiving area to transship based on a plurality of factors including current inventory in or expected to be in each materials handling facility and an order fulfillment demand forecast for each materials handling facility.

6. The materials handling facility of claim 1, wherein one of the one or more containers assigned to a transshipment destination comprises a plurality of different types of items.

7. The materials handling facility of claim 1, wherein one of the containers assigned to a transshipment destination is a pallet of items, wherein the pallet is directed by the control system to the shipping area for transshipment to another materials handling facility without the items in the pallet being removed from the pallet.

8. A method, comprising:
performing by one or more computing devices:
determining a plurality of containers of items that are in a receiving area of a materials handling facility;
selecting one or more containers of the plurality of containers of items in the receiving area for a transshipment crossdock process; and
directing the selected one or more containers of items from the receiving area to a shipping area for transshipment to another materials handling facility without the items in the selected one or more containers being stowed in an inventory area of the materials handling facility, wherein the items in the selected one or more containers are moved to the shipping area in a materials handling facility and without the items in the one or more other containers going through an item-level sortation process.

9. The method of claim 8, further comprising directing containers not selected for the transshipment crossdock process to an inventory area of the materials handling facility for stowing.

10. The method of claim 8, further comprising directing items to shipping for order fulfillment using a processing line that does not include a sortation process for sorting items for shipping, wherein the one or more containers of items are directed from the receiving area to the shipping area for transshipment to another materials handling facility using the processing line that does not include a sortation process.

11. The method of claim 8, further comprising:
directing items to shipping for order fulfillment using a processing line that does include a sortation process for sorting items for shipping;
assigning items to a transshipment destination at an item-level granularity and directing the items for transshipment using the processing line that does include a sortation process; and
in response to determining that the sorting process has met a capacity threshold, switching to assigning assign items to a transshipment destination at a container-level granularity and directing corresponding containers for transshipment without item-level sortation processing.

12. The method of claim 8,
wherein the materials handling facility is part of a fulfillment network comprising the materials handling facility and a plurality of other materials handling facilities, and further comprising determining which containers of items in the receiving area to transship based on a plurality of factors including a current inventory in or expected to be in each materials handling facility, and an order fulfillment demand forecast for each materials handling facility.

13. The method of claim 12, wherein the plurality of factors further includes one selected from a total estimated crossdock volume, and an estimated transfer time between the facilities of the transshipment.

14. The method of claim 12, wherein the plurality of factors further includes a cost to sort the container, an expected cost of the transshipment of the item, or an estimated cost to fulfill a predicted customer demand.

15. The method of claim 8, wherein one of the one or more containers directed to a transshipment destination comprises a plurality of different types of items.

16. A non-transitory computer-readable medium, storing program instructions that are computer-executable to perform:
identifying a plurality of containers each holding a plurality of items in a receiving area of a materials handling facility;
selecting one or more containers of the plurality of containers of items in the receiving area for a transship-crossdock process; and
directing the selected one or more containers of items from the receiving area to a shipping area for transshipment to another materials handling facility without the items in the one or more containers being stowed in an inventory area of the materials handling facility and without an item-level sortation process sorting the items in the one or more containers.

17. The non-transitory computer-readable medium of claim 16, wherein the program instructions are further executable to perform:
directing containers not selected for the transship-crossdock process to the inventory area for stowing; and
directing stowing of one or more items of the containers directed to inventory in the inventory area.

18. The non-transitory computer-readable medium of claim 16, wherein the program instructions are further executable to perform:
selecting a received pallet of items for transshipment to another facility such that one of the selected containers is the received pallet; and
directing the selected pallet of items to the shipping area for transshipment to another materials handling facility without the items in the pallet being removed from the pallet.

19. The non-transitory computer-readable medium of claim 16, wherein the program instructions are further executable to perform determining which containers of items in the receiving area to transship based on a plurality of factors including at least two factors selected from a total estimated crossdock volume, an estimated transfer time between the facilities of the transshipment, a cost to sort the container, an expected cost of the transshipment of the container, a current inventory of each of the facilities, an expected future inventory of each of the facilities, predicted customer demand, and an estimated cost to fulfill the predicted customer demand.

20. The non-transitory computer-readable medium of claim 16, wherein the program instructions are further executable to perform directing items to shipping for order fulfillment using a processing line that does include a sortation process for sorting items for shipping, wherein the one or more containers selected for transshipment are directed from the receiving area to the shipping area for transshipment to another materials handling facility without using the sortation process and without being stowed to an inventory area.

* * * * *